United States Patent
Hampton

(10) Patent No.: US 10,326,346 B2
(45) Date of Patent: Jun. 18, 2019

(54) MOVEMENT GENERATING DEVICE

(71) Applicant: Paul V. Hampton, Glen Waverly (AU)

(72) Inventor: Paul V. Hampton, Glen Waverly (AU)

( * ) Notice: Subject to any disclaimer, the term of this patent is extended or adjusted under 35 U.S.C. 154(b) by 867 days.

(21) Appl. No.: 14/792,928

(22) Filed: Jul. 7, 2015

(65) Prior Publication Data

US 2016/0190904 A1   Jun. 30, 2016

(30) Foreign Application Priority Data

Jul. 7, 2014   (AU) .................................. 2014203708

(51) Int. Cl.
*H02K 41/02* (2006.01)
*F03G 7/10* (2006.01)
*H02K 53/00* (2006.01)

(52) U.S. Cl.
CPC .............. *H02K 41/02* (2013.01); *F03G 7/10* (2013.01); *H02K 53/00* (2013.01)

(58) Field of Classification Search
CPC .......... H02K 41/02; H02K 57/00; H02K 7/06; H02K 33/18; H02K 49/10; H02K 49/00; B06B 1/02; B06B 1/04; F16F 15/03
See application file for complete search history.

(56) References Cited

U.S. PATENT DOCUMENTS

| 3,935,487 A * | 1/1976 | Czerniak | H02K 99/20 310/46 |
| 6,060,804 A * | 5/2000 | Fujita | B06B 1/045 310/12.19 |
| 2007/0210665 A1* | 9/2007 | Moe | H02K 49/10 310/180 |
| 2011/0001370 A1* | 1/2011 | Yamada | F03C 1/0607 310/54 |

FOREIGN PATENT DOCUMENTS

| CN | 101753065 A | 6/2010 |
| DE | 20 2006 002 105 U1 | 1/2006 |
| JP | 2008-54374 A | 3/2008 |
| WO | WO 2010/000316 A1 | 1/2010 |

* cited by examiner

*Primary Examiner* — Quyen P Leung
*Assistant Examiner* — Leda T Pham
(74) *Attorney, Agent, or Firm* — Law Office of John W. Harbst

(57) ABSTRACT

A movement generating device (10) comprising an input energy source (30), a shaft (28) adapted for movement substantially along a first axis with energy provided from said input energy source (30), a traction magnetic device (14) connected to said shaft (28), a power magnetic device (16) that is fixed in position, wherein the traction magnetic device (14) moves across the power magnetic device (16) to produce a movement from which energy can be produced.

18 Claims, 12 Drawing Sheets

MOVEMENT GENERATING DEVICE

CROSS REFERENCE TO RELATED APPLICATION

This patent application claims priority from Australian patent application Serial No. 2014203708 and the contents of that patent application are incorporated herein by reference.

FIELD OF THE INVENTION

This invention relates to a movement generating device and more particularly to a device for creating movement and energy using magnetic fields.

BACKGROUND OF THE INVENTION

Magnets and magnetic materials have been used for many years and applied in many ways. Magnetic devices have been used in electric motors and generators to convert one form of energy into another form of energy. However some systems fail or become less than optimal due to excessive wear and tear in converting this energy on a continual basis. Furthermore some systems create heat which has to be dissipated in some manner which can require an additional cost. Other systems have many moving parts which are overly complex and require high maintenance and, in some cases, excessive costs due to the need to replace parts. Some magnetic systems use high voltages and therefore consume large amounts of energy which adds to the overall cost of such systems.

The present invention seeks to overcome one or more of the above disadvantages by providing a system that substantially reduces wear and tear, has less moving parts, has low maintenance and has no heat to dissipate.

SUMMARY OF THE INVENTION

According to a first aspect of the invention, there is provided a movement generating device comprising:
 an input energy source;
 a shaft adapted for motion substantially along a first axis with energy provided from said input energy source;
 a first sub-system comprising a first traction magnetic device connected to said shaft and a first power magnetic device fixed in position;
 said first traction magnetic device also connected to or linked to an article;
 a second sub-system comprising a second traction magnetic device and a second power magnetic device fixed in position, said second traction magnetic device connected to the shaft to balance the magnetic force of the first traction magnetic device in the first sub-system;
 wherein during a cycle of the movement generating device the first traction magnetic device moves across the first power magnetic device such that movement of the first traction magnetic device drives or moves the article to produce energy;
 such that when the first traction magnetic device moves across the first power magnetic device, said second traction magnetic device undergoes a resetting movement, whereby a portion of the second traction magnetic device contacts or is in proximity to a portion of a fixed foundation magnetic device in said second sub-system.

According to a second aspect of the invention, there is provided a movement generating device comprising:
 an input energy source;
 a shaft adapted for movement substantially along a first axis with energy provided from said input energy source;
 a traction magnetic device connected to said shaft;
 a power magnetic device that is fixed in position;
 wherein the traction magnetic device moves across the power magnetic device to produce a movement from which energy can be produced.

The device may further comprise a counterweight device attached to the shaft to balance the weight of the traction magnetic device. The traction magnetic device may form part of a first sub-system and the movement generating device may further comprise a second traction magnetic device in a second sub-system where the second traction magnetic device is connected to the shaft to balance the weight of the traction magnetic device of the first sub-system.

Preferably the movement produced is substantially orthogonal to the first axis. The traction magnetic device preferably moves through a cycle controlled by movement of the shaft by the input energy source and the effects of other magnetic devices. Preferably the traction magnetic device produces one movement per cycle from which energy can be produced. Preferably the second traction magnetic device produces one movement per cycle from which energy can be produced so that two such movements are produced over one cycle in the movement generating device.

The device may further comprise a second power magnetic device, wherein the second traction magnetic device moves across the second power magnetic device to produce a movement from which energy can be produced. Preferably when the traction magnetic device undergoes the movement to produce energy, the second traction magnetic device undergoes a resetting movement at substantially the same time. Preferably when the second traction magnetic device undergoes the respective movement to produce energy, the traction magnetic device in the first sub-system undergoes a resetting movement at substantially the same time.

The device may further comprise a foundation magnetic device in the first sub-system relative to which the traction magnetic device moves in the cycle. The device may further comprise a second foundation magnetic device in the second sub-system relative to which the second traction magnetic device moves in the cycle.

The shaft is preferably connected to a displacement device driven by the input energy source, the displacement device having a swashplate or wobble plate in contact with the shaft so that as the swashplate/wobble plate rotates under the action of the input energy source, the shaft is displaced in an up and down motion during the cycle to thereby move the traction magnetic device. Preferably after the traction magnetic device has produced the movement it progresses to leave the field produced by the foundation magnetic device and has an inner face that does not exceed more than half the height of an inner face of the foundation magnetic device.

According to a third aspect of the invention, there is provided a method of generating movement in a system using a magnetic device comprising the steps of:
 providing an input energy source;
 providing energy from said input energy source to a shaft adapted for movement substantially along a first axis;
 connecting a first traction magnetic device in a first sub-system to said shaft and to an article;
 providing a first power magnetic device fixed in position in said first sub-system;
 providing a second traction magnetic device and a second power magnetic device in a second sub-system;

connecting said second traction magnetic device to the shaft thereby balancing the magnetic force of the first traction magnetic device in the first sub-system;

producing a movement of the first traction magnetic device across the first power magnetic device during a cycle such that said movement of the first traction magnetic device across the first power magnetic device drives or moves said article to produce energy;

resetting the system such that when said first traction magnetic device undergoes said movement across the first power magnetic device to produce energy, said second traction magnetic device undergoes a resetting movement, whereby a portion of the second traction magnetic device contacts or is in proximity to a portion of a fixed foundation magnetic device in said second sub-system, to enable the first traction magnetic device to move across the first power magnetic device at a stage in the cycle.

According to a fourth aspect of the invention, there is provided a method of generating movement using a magnetic device comprising the steps of:

providing an input energy source;

providing energy from said input energy source to a shaft adapted for movement substantially along a first axis;

connecting a traction magnetic device to said shaft;

providing a power magnetic device that is fixed in position;

producing a movement from which energy can be produced by the traction magnetic device moving across the power magnetic device.

BRIEF DESCRIPTION OF THE DRAWINGS

Preferred embodiments of the invention will hereinafter be described, by way of example only, with reference to the drawings in which.

DETAILED DESCRIPTION OF THE PREFERRED EMBODIMENT

When describing two magnetic devices trying to force each other away from one another, this is called "balance". When two magnetic devices move across the magnetic field of each other without moving away from each other, this is called a "positive force". The system 10 brings these two actions together.

Figure 1A:
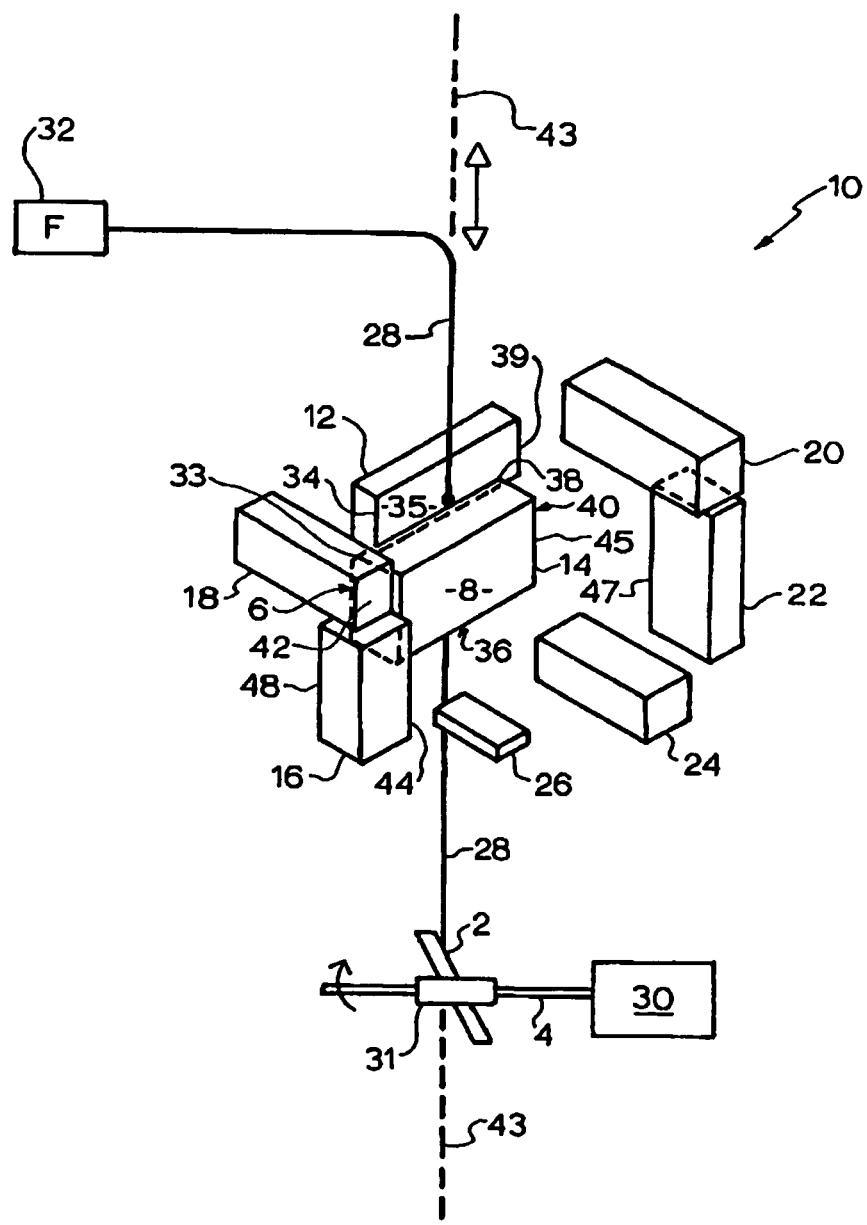
FIG. 1A is a perspective view of a movement generating device according to an embodiment of the invention.
Figure 1B:
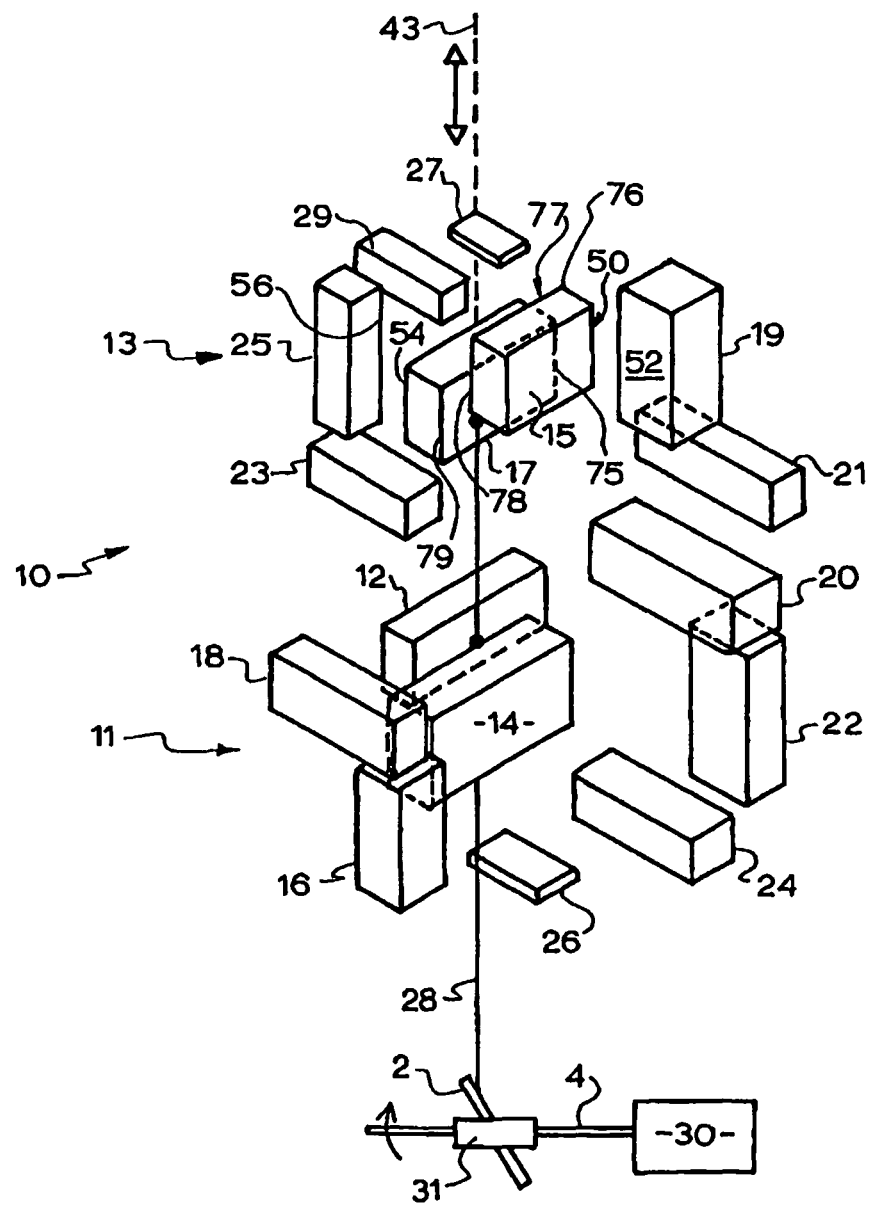
FIG. 1B is a perspective view of a movement generating device according to a further embodiment of the invention.

Referring to FIGS. 1A and 1B there is shown a perspective view of a magnetic system 10 that enables the output of energy. The system 10 includes a first foundation (base) magnetic device 12 and a first traction magnetic device 14 which moves with respect to magnetic device 12 and are both included in an inner core area. Also included in the inner core area is magnetic device 24 which is a stabilizing device and device 26, which is generally non-magnetic. Located respectively at the front and back of magnetic device 14 is magnetic device 18 and magnetic device 20, which are both reverse polarity magnetic devices. Magnetic device 16, termed a power magnetic device, is adjacent to magnetic device 18 at the front of magnetic device 14 while magnetic device 22, being a further stabilizing magnetic device, is adjacent to magnetic device 20 at the rear of magnetic device 14. Each of the devices 16, 18, 20, 22, 24 and 26 are contained in an outer field around the inner core Magnetic device 14 is connected to shaft 28 which in turn is driven in an up and down motion, substantially along a first axis 43, by a displacement device 31 connected to a shaft 4 of electric motor 30, the displacement device 31 being connected to the shaft 28 through device 2 and respective bearings. The displacement device preferably includes a cylinder that has a device 2 in the form of a wobble plate or swashplate on an offset axis attached to the cylinder, so that as the cylinder is rotated by the shaft 4 and motor 30, it presents a changing depth of contact surface or edge to the shaft 28 to make the shaft go up and down in a cycle. The bottom of the shaft 28 contacts the wobble plate 2 through one or more bearings on the shaft 28 to enable continuous cycles of movement of magnetic device 14 to occur and produce energy. In one embodiment, a counterweight device 32 is connected to the other end of shaft 28 in order to counterbalance the weight of magnetic device 14. Motor 30 can derive power from either battery or AC mains electricity.

As an alternative to using the counterweight device 32, a separate inverted magnetic system 13 shown in FIG. 1B can be placed adjacent to the original magnetic system 11 with the shaft 28 connected to a further second traction magnetic device 17 which corresponds with traction magnetic device 14. The upper system 13 has magnetic devices 19 (second power magnetic device) and 21 (reverse polarity magnetic device) which are positioned in a mirror image of magnetic devices 16 and 18. Likewise magnetic devices 23 (reverse polarity magnetic device) and 25 (stabilizing magnetic device) are positioned in a mirror image of magnetic devices 20 and 22. Magnetic device 29 (stabilizing magnetic device) and non-magnetic device 27 are in a mirror image compared with devices 24 and 26 respectively. Magnetic device 15 (further or second foundation (base) magnetic device), which corresponds to foundation magnetic device 12, is stationary with traction magnetic device 17 moving relative to it. Both devices 15 and 17 are also in a further inner core in the upper system 13. Each of the magnetic devices 19, 21, 23, 25, 27 and 29 are located in a further outer field of the upper magnetic system 13.

In operation, the cycle starts when electric motor 30 is operating and moves shaft 28 upwardly and therefore moves magnetic device 14 upwardly with respect to magnetic device 12. At the same time magnetic device 17 also moves upwardly and with respect to magnetic device 15. Magnetic device 14 is in contact at the near side end with magnetic device 12 either directly or with a pad that can be affixed to either magnetic device 14 or magnetic device 12, or magnetic device 14 can be in close or adjacent proximity to magnetic device 12. That is, edge 33 of magnetic device 14 is in contact with edge 34 or face 35 of the magnetic device 12. This is due to the influence of magnetic device 16 which will be described at the end of the cycle. Magnetic device 14 still moves upwardly relative to magnetic device 12 but still has its edge 33 in contact with, or in close proximity to, edge 34 or another part of face 35 of magnetic device 12. As the inner face 6 of magnetic device 14 starts to leave the inner face 35 of magnetic device 12, but not exceeding past the halfway point 72 of face 35 (see also FIG. 2A), the edge 33 disengages with or moves away from edge 34 (or face 35) and essentially magnetic device 14 remains substantially parallel to magnetic device 12 as magnetic device 14 is now under the influence of magnetic device 19 in the upper system 13. The influence of magnetic device 19 is such that it produces an equal force that moves edge 38 of magnetic device 14 to be in contact with edge 39 or face 35 of magnetic device 12. This in effect resets the system, so that movement of the magnetic device 14 in the opposite direction will be possible later in the cycle, to extract useful energy from this opposite motion.

Shortly thereafter, magnetic device 14 starts a downward descent but is forced to have edge 38 disengage from edge 39 by face 44 of magnetic device 16 as magnetic device 14 moves through a phase where magnetic device 14 can start to move across magnetic device 16 and toward edge 34 (or face 35) but will still remain parallel to magnetic device 12. Thus in a two-fold action, which occurs simultaneously, edge 33 comes into contact with or is in close proximity to edge 34 (or face 35) of magnetic device 12. The first instance is when the back face 40 of magnetic device 14, after edge 38 has disengaged from edge 39, under the influence of magnets 20 and 22 moves towards magnetic device 22 and in the second instance it simultaneously occurs when face 42 of magnetic device 14 moves parallel to and directly across face 44 of magnetic device 16. The two actions assist one another, however edge 45 of magnetic device 14 does not make contact with magnetic device 22 but instead brushes past in an arc near edge 47 of magnetic device 22. This is due to both the edges 45 and 47 having a north-bias. Similarly, edge 33 is biased towards face 48 of magnetic device 16 as they are both south-biased magnetic sections. Therefore, face 42 of magnetic device 14 slides across parallel with face 44 of magnetic device 16 so that once again contact (or adjacent proximity) is made between edge 33 on magnetic device 14 with face 35 or edge 34 of magnetic device 12. Essentially the previous step, where edge 38 contacted (or was in close proximity to) face 35 or edge 39, is a resetting process that enables the latter movement a half cycle later where edge 33 makes contact with edge 34 and, with equal force at both ends of magnetic device 14, this allows magnetic device 17 in the upper system 13 to move magnetic device 14 near to magnetic device 16. At substantially the same time as the resetting takes place in the first sub-system 11, where edge 38 contacted (or in close proximity to) face 35 or edge 39, movement from which useful energy can be derived occurs in the upper sub-system 13, where face 50 of magnetic device 17 moves across face 52 of magnetic device 19. There is also a resetting process in the upper system 13 when magnetic device 14 produces movement across the face 44 of magnetic device 16. That is edge 79 of magnetic device 17 makes contact with (or is in close proximity to) either edge 78 or face 77 of magnetic device 15 under the influence of magnetic device 16.

The movement of magnetic device 14 across the face 44 of magnetic device 16 provides useful energy. For example the energy from the movement of magnetic device 14 towards magnetic device 12 can be used to power an article 36 such as a pump, for example pumping recirculated water. Other uses include a generator more particularly a small disk generator.

Figure 1C:
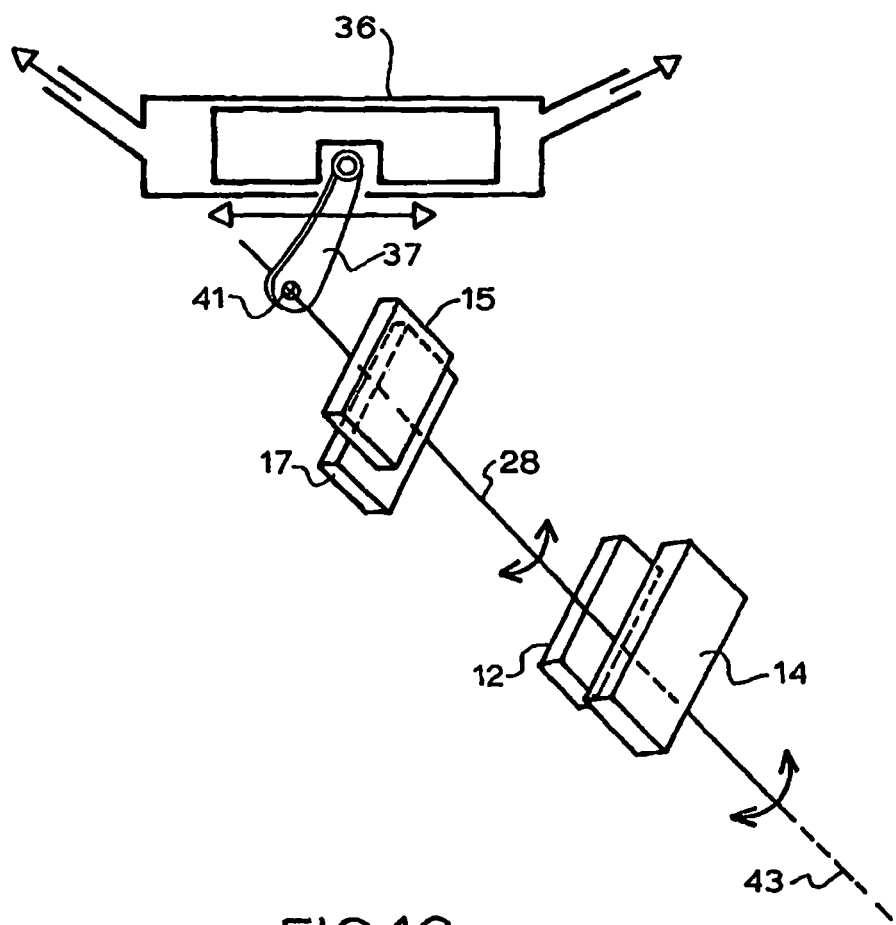
FIG. 1C is a perspective view of a device, such as a pump, that utilises the energy produced by movement generated from the device according to the invention.

An example of a pump being driven from the useful energy produced by the system 10 is shown in FIG. 1C. Shaft 28 rotates through the contact between first traction magnetic device 14 and first base or foundation magnetic device 12 (or by magnetic device 14 being in close proximity to magnetic device 12 to force movement of the shaft 28) and contact between second traction magnetic device 17 and second foundation (base) magnetic device 15 (or by magnetic device 17 being in close proximity to magnetic device 15 to force movement of the shaft 28), as described above. As the shaft rotates it enables movement back and forth of a plunger on a pump 36, through handle or arm 37 which is connected to shaft 28 at connection point 41. The connection point 41 allows for movement of shaft 28 through the connection point 41, which is the up and down motion of the traction magnetic devices 14 and 17. Movement of shaft 28 is akin to movement of an agitator in a washing machine. Thus the shaft 28 is displaced in one direction, for example a clockwise direction with respect to axis 43, by the interaction (through adjacent proximity or contact of magnetic device 14 with magnetic device 12) to move the plunger of the pump in one direction, while the shaft 28 is displaced in an opposite direction to the first direction, for example an anti-clockwise direction with respect to axis 43, by the interaction (through adjacent proximity or contact of magnetic device 17 with magnetic device 15) to move the plunger of the pump in an opposite direction.

The energy derived from system 10 can be used by a generator, for example charging batteries in electric motor vehicles, or charging general storage batteries instead of using solar panels. Use of a generator can be made 24 hours a day, seven days a week and can output a constant voltage. The system 10 can be used in confined spaces without giving out toxic gases, such as can be emitted from petroleum-based products or engines.

The amount of work load resistance, such as from a pump or generator, will apply a force to magnetic device 14 as that force will determine how far down magnetic device 14 travels as it starts to increase positive (output) force, such as the force going to the pump.

Figure 2B:
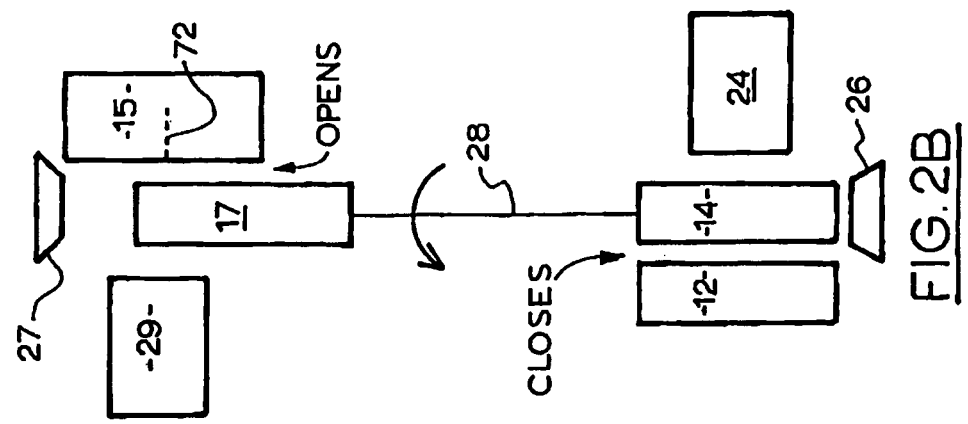
FIG. 2B is a schematic view showing interaction between magnetic devices in a lower sub-system that produces energy from movement of one of the magnetic devices.
Figure 2A:
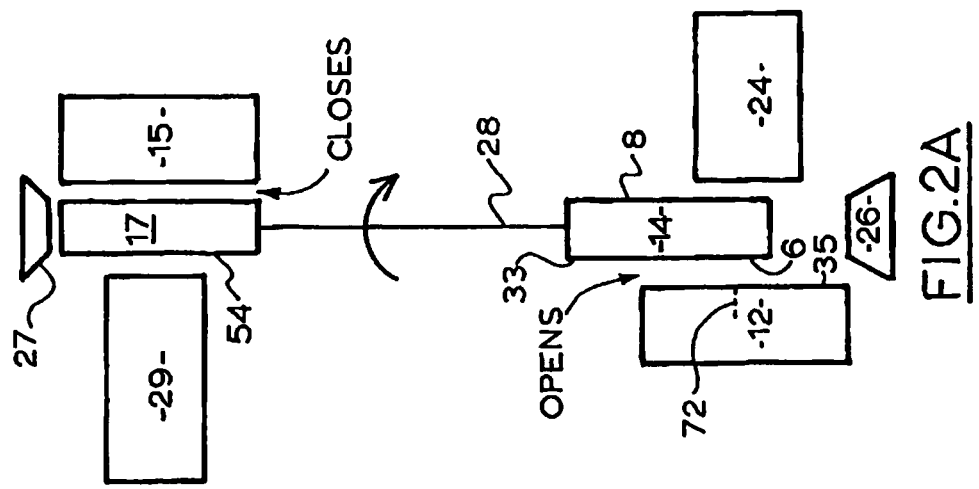
FIG. 2A is a schematic view showing interaction between magnetic devices in an upper sub-system that produces energy from movement of one of the magnetic devices.

Referring to FIGS. 2A, 2B and FIGS. 1A and 1B, when the useful energy is derived from the movement of the magnetic device 14 across the face 44 magnetic device 16, the corresponding magnetic device 17 in the upper section, which is connected by shaft 28 to magnetic device 14, is not engaged and in fact is displaced from corresponding magnetic device 15 so that no useful energy has output from the movement of magnetic device 17. It is effectively in an OFF position, while magnetic device 14 is in an ON position. An example of this is shown in FIG. 2B where magnetic device 14 is adjacent to magnetic device 12 and has either just imparted force or is about to impart a force by making contact with magnetic device 12. At the same time, magnetic device 17 is essentially out of the field of magnetic device 15 and has no force with which it can apply to produce useful energy. The reverse is the case in FIG. 2A where no force is being produced from magnetic device 14 as it is moving out of the field of magnetic device 12. At the same time magnetic device 17, in the upper system 13, is adjacent to magnetic device 15 and is about to produce a force or has just produced a force which is converted into useful energy. Therefore it is seen that in a complete cycle there are two movements that produce useful energy, one in the lower system 11 and the other in the upper system 13.

In the upper system 13 the movement that produces energy is due to the movement of rear face 50 of magnetic device 17 across the front face 52 of magnetic device 19 (similar to the movement of magnetic device 14 across the face 44 of magnetic device 16 as previously described regarding the first sub-system 11) and at the same time movement of edge 54 of magnetic device 17 passing edge 56 of magnetic device 25 in a similar fashion to the movement of magnetic device 14 in relation to magnetic device 22 (as previously described regarding the first sub-system 11). Thus edge 75 of magnetic device 17 makes contact, through the above movement, with either edge 76 or face 77 of magnetic device 15.

Figure 2C:
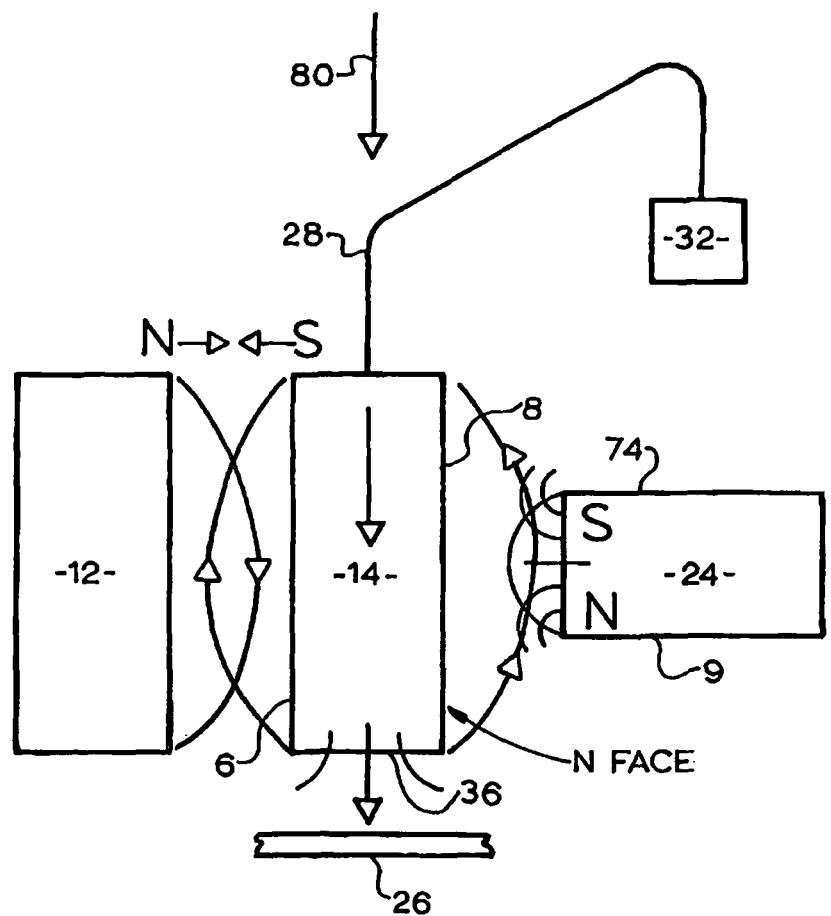
FIG. 2C is a schematic diagram showing movement of the first traction magnetic device with respect to fixed magnetic devices and having a counterweight device for balancing the first magnetic device.

In FIG. 2C there is shown the downward movement, as indicated at 80, of magnetic device 14 relative to fixed magnetic device 12 where counter weight device 32 is used. Magnetic device 24 with its south-biased (top) face 74 and north-biased (lower) face 9 keeps face 8 of magnetic device 14 in balance as it progresses downwardly. Device 32 is a counter weight to magnetic device 14. Magnetic device 14 is attracted to non-magnetic device 26 through its own magnetic field.

Figure 3:
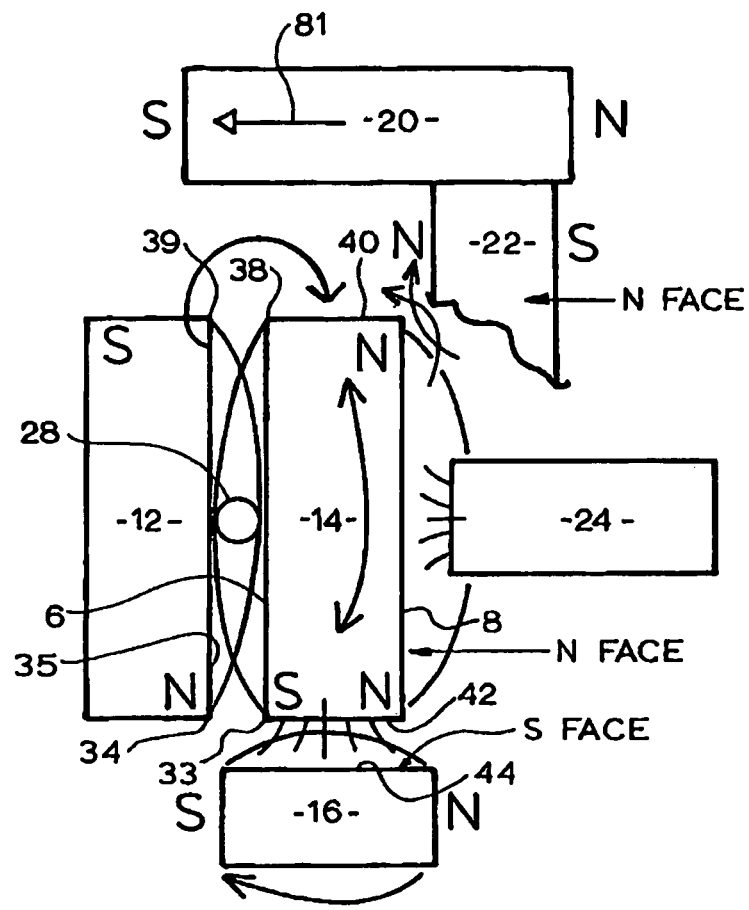
FIG. 3 is a schematic diagram showing magnetic lines of force associated with the first traction magnetic device and the fixed magnetic devices.

Shown in FIG. 3 is a more detailed diagram of the interaction of magnetic device 14 as it moves through the cycle and shows the various lines of magnetic force. When magnetic device 14 is moving upwardly and retreating from the field of magnetic device 12, it comes under the influence of magnetic device 19, in upper system 13, whereby it moves towards magnetic device 12 through the magnetic field of magnetic device 19. Edge 38 abuts against either edge 39 or face 35 of magnetic device 12. This is aided by the north-biased field of magnetic device 14 attracting to the south-biased field of magnetic device 12. On its downward descent magnetic device 14 separates from magnetic device 12 and due to the north-biased magnetic device 22 coming within the vicinity of north-biased face 40 of magnetic device 14, they stay separated from each other while at the same time the front face 42 of magnetic device 14 comes within the field of magnetic device 12 and also under the influence of magnetic device 16. The north-biased face 8 of magnetic device 14 moves across the south-biased face 44 of magnetic device 16 but does not actually contact the face 44. Edge 33 of magnetic device 14 then comes into contact with either edge 34 or face 35 of magnetic device 12 as a point to point contact as magnetic device 14 pivots about shaft 28.

With the movement of magnetic device 14 at an offset end (or face 40) towards magnetic device 22 the same force is applied at the other end where magnetic device 14 moves towards the face 44 of magnetic device 16. This makes both movements balanced but the balance works in the outer field with the movement of magnetic device 14 across magnetic device 20 towards magnetic device 22 and across magnetic device 18 towards face 44 of magnetic device 16. When magnetic device 14 moves across the magnetic field of magnetic device 16, the lines of force within magnetic device 16 compress. Magnetic lines of force are shown for magnetic device 12 going to magnetic device 14, from magnetic device 14 to magnetic device 16 and from magnetic device 14 to magnetic device 22. Arrows are shown for the direction of movement of magnetic device 14 and arrow for field replacement magnetic device 12 to end field of magnetic device 14 and an arrow 81 for magnetic device 20 to show the direction of magnetic flow.

Figure 3A:
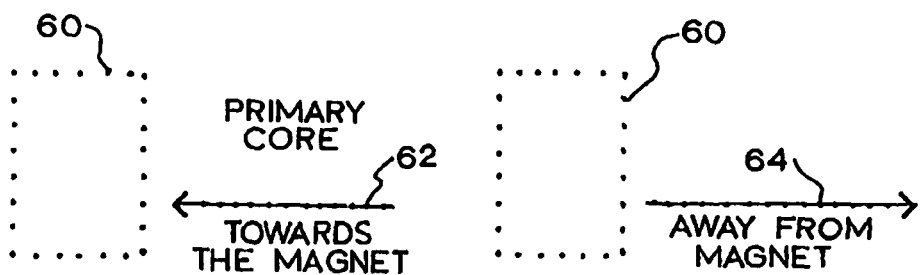
FIG. 3A is a schematic diagram showing movement of the first traction magnetic device in a primary core and an outer field.
Figure 3A:
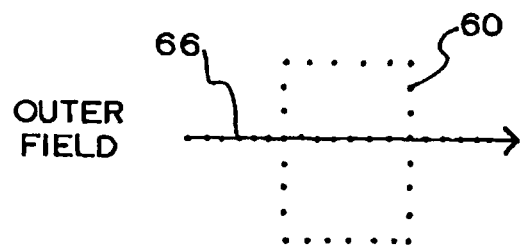
Figure 3A:
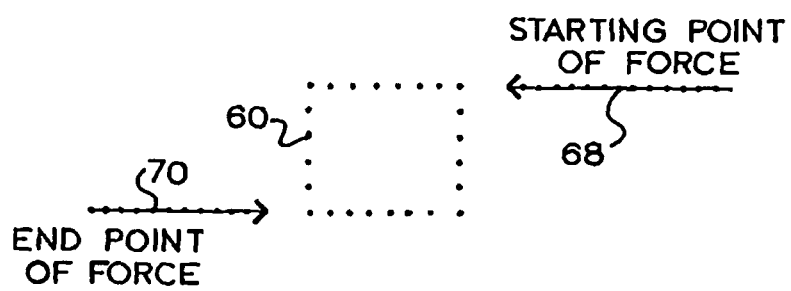

FIG. 3A shows the magnetic forces involved in the system 10. An outline of a magnet 60 is shown, where for the primary core, the force is a form of either pushing away (indicated at 64) or pulling towards (indicated at 62) the magnet, as this balances the traction magnetic device 14 because it is a part of the primary core. The outer field shown at 66 does not move toward or away from the magnet 60, but moves across magnet 60 so that it crosses the lines of force. The magnetic force working within the primary core is not the force that works within the outer field. In the lower part of the Figure there is shown a self-correcting force. The starting point of force is shown at 68 and the ending point of the force is shown at 70 being applied to magnet 60

Figure 3B:
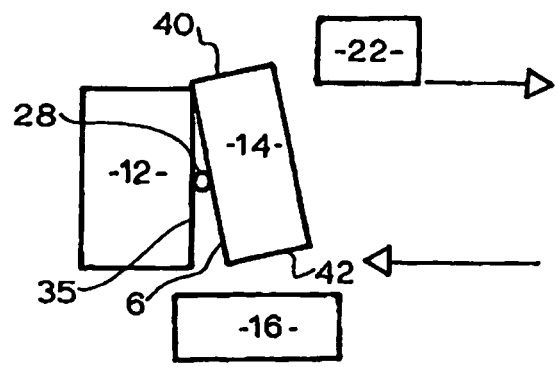
FIG. 3B is a schematic diagram showing movement of the first traction magnetic device under the influence of fixed magnetic devices.
Figure 4:
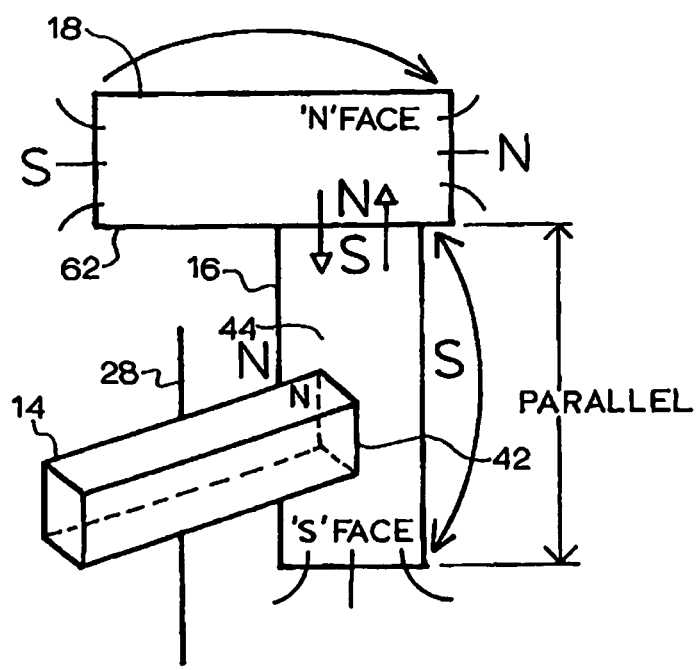
FIG. 4 is a schematic diagram showing the movement of the first traction magnetic device across the second magnetic device resulting in movement and energy.

In FIG. 3B there is shown an example of the applied force within magnetic device 12. The force from magnetic device 16 will overcome the force from magnetic device 12. Starting at the offset end (face 40) of magnetic device 14, it will first equalise that force and then exceed it to create movement under force as the magnetic device 14 sweeps across face 44 of magnetic device 16. The force that is created by the magnetic field of magnetic device 12 will start to decrease until it reaches a point where the forces within the magnetic field of magnetic device 12 are equal, then the force at the opposite end (face 42) will dominate as the magnetic force from magnetic device 16 draws magnetic device 14 towards magnetic device 12 at the face to face end (face 6 to face 35 at the ends nearest magnetic device 16) as force within the magnetic field of magnetic device 12 remains neutral and there is no magnetic gain. FIG. 4 shows the movement of magnetic device 14 across magnetic device 16 from a different angle compared to FIG. 3. Face 42 of magnetic device 14 moves across the front face 44 of magnetic device 16 in a parallel fashion. Magnetic device 18 has on its lower face 62 a north bias with is attracted to a south bias on magnetic device 16.

System 10 is an anti-stall device where the force from the resistance of a pump for example, created by work, through magnetic device 14, does not and cannot impact on the energy source in the form of motor 30. In other words the up and down movement of the shaft 28 attached to magnetic device 14 provided by motor 30 will not be affected by the force produced by magnetic device 16. By having two magnetic fields set at right angles to one another, the first field or movement is by motor 30 moving shaft 28 in an up and down motion. The second field applies a force across shaft 28 at right angles to the up/down movement of shaft 28. This has no impact upon the movement of shaft 28 or on the motor 30.

Figure 4A:
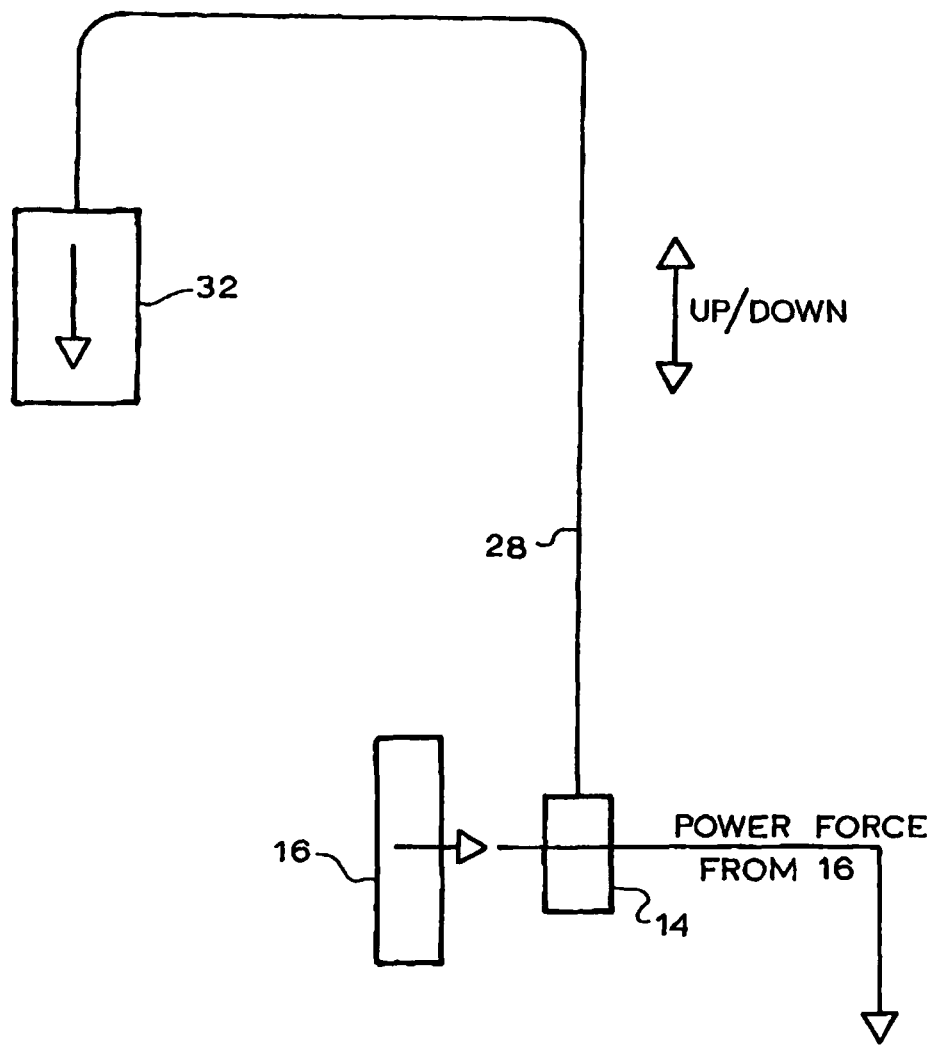
FIG. 4A is a schematic diagram showing separate independent orthogonal movements of the first traction magnetic device.

This is illustrated in FIG. 4A, where motor 30, device 31 and swashplate 2 provide up and down movement for magnetic device 14 through shaft 28 with a counter balanced force provided by counter weight device 32 (or magnetic device 17). Magnetic force from magnetic device 16, across its face 44, is applied to magnetic device 16 to move it in a direction perpendicular to the up and down motion of the shaft 28 and this is a separate force from the input force provided by motor 30. Furthermore, any increase or decrease in speed of the cycle of magnetic device 14 will not affect the operation of motor 30 or the energy force produced by motor 30.

Figure 5:
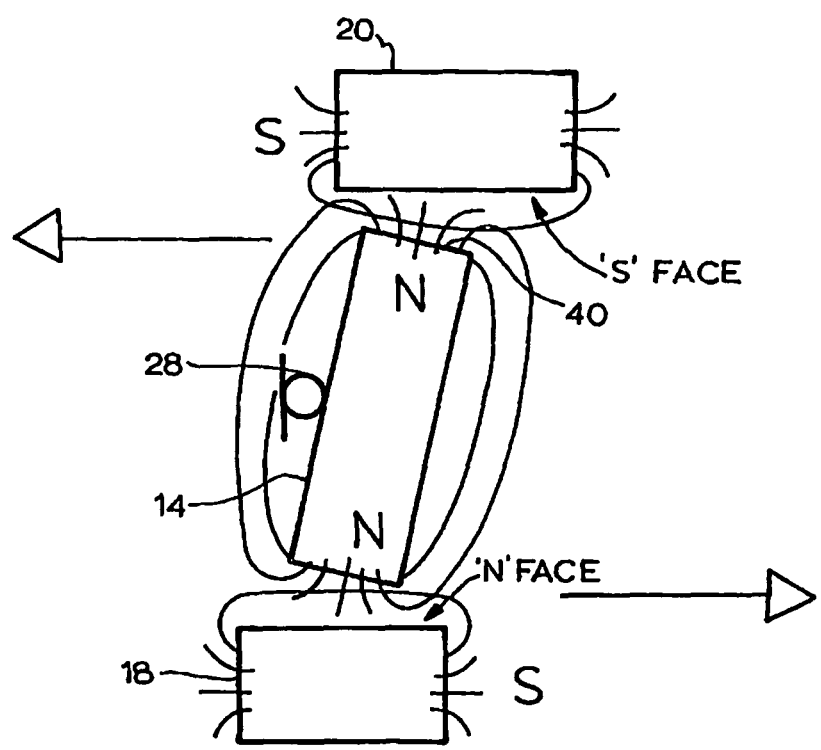
FIG. 5 is a schematic diagram showing the effect of reverse polarity magnetic devices and lines of force acting on the first traction magnetic device.

FIG. 5 shows a further diagram of the forces that act on magnetic device 14. The north face 40 of magnetic device 14 moves across the south face of magnetic device 20 on its way to passing magnetic device 22. At the same time the south face of magnetic device 14 moves across the north face of magnetic device 18.

Figure 6:
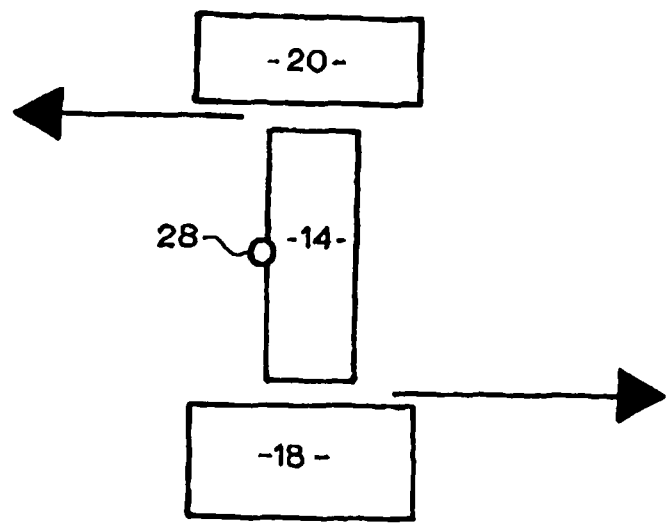
FIG. 6 is a schematic diagram similar to FIG. 5 showing the reverse polarity magnetic devices acting on the first traction magnetic device.

As with FIG. 5, FIG. 6 shows magnetic devices 18 and 20 in a reverse polarity field whereby the end fields of magnetic device 14 will work in opposite directions. Through magnetic device 14 the polarity can be reversed back to the power magnetic device 16 which allows magnetic device 14 to move across the face 44 of magnetic device 16.

In sub-system 11, magnetic device 12, magnetic device 24 and non-magnetic device 26 together with magnetic device 14 form the inner or central core. In the outer field around the central core are reverse polarity magnetic devices 18 and 20, stabilising magnetic device 22 and power magnetic device 16. Only magnetic device 14 moves with respect to the other magnetic devices which are all fixed in place. As the other magnetic devices are fixed they apply a force only to the moving magnetic device 14. Either use of a counter-weight 32 or a corresponding magnetic device 17, attached to magnetic device 14, enables magnetic device 14 to move upwardly and downwardly with magnetism. The same magnetic force is maintained regardless of the position of magnetic device 14 as the magnetic force is controlled by the movement of magnetic device 14. It regulates the magnetic force within the magnetic field as this controls the strength of the magnetic force by keeping a distance between the magnetic devices fixed so that magnetic device 14 can maintain the force while rotating within the magnetic field.

Magnetic devices 12 and 15 in each sub-system 11 and 13 are essentially a base or foundation magnetic device while magnetic device 14 (and device 17) provides mechanical force generated through the end fields and this also unifies the outer field in which some of the other magnetic devices, such as 20 and 22 are located. Magnetic device 24 is a stabilising magnetic device for both magnetic devices 12 and 14 while magnetic devices 20 and 18 are reverse polarity field magnets where both ends work in unison. Device 26 acts like a magnetic device but has the ability only to attract and it does not provide its own magnetic field. The counter-weight device 32 provides equal counter-force to the primary core while magnetic device 16 is where the positive energy is produced through its interaction with magnetic device 14. Finally magnetic device 22 is a stabilising magnetic device which stabilises the outer field and creates magnetic variation within the magnetic field to trigger an outward force. It assists in the continuous movement of the magnetic device 14 though parallel magnetism.

When magnetic device 14 starts to leave the field of magnetic device 12 it enters the field of magnetic devices 20 and 18 which are reverse polarity magnetic fields. This reduces the magnetic force of magnetic device 16 by using magnetic device 14 to straddle magnetic devices 18 and 16 and reducing negative and positive fields of magnetic device 16. When magnetic device 14 moves downwardly and along the front face 44 of magnetic device 16, it leaves the reverse polarity field of magnetic devices 20 and 18. Magnetic device 14 continues on towards the other end of magnetic device 16 as magnetic device 14 moves parallel to the field of magnetic device 12. Magnetic device 14 starts to come under pressure allowing it to again cross positive and negative fields as it leave the positive side of the field of magnetic device 16. It then makes contact with magnetic device 12 while moving back on to magnetic device 12 and the magnetic fields of devices 12 and 14 have drawn together which completes one cycle.

Magnetic device 14 works with magnetic devices 12, 24 and non-magnetic device 26 to balance the field. Magnetic device 24 is a fixed magnetic device and works within the magnetic field around magnetic device 14 and together with magnetic device 12 holds magnetic device 14 under control. The base plate non-magnetic device 26 assists when magnetic device 14 is retracting into the magnetic field of magnetic devices 12 and 24. Either the counter-weight 32 or magnetic device 17 counters each of magnetic devices 12, 24 and 26 which allows magnetic device 14 to move freely within the magnetic environment. Non-magnetic devices 26 and 27 can be made from a soft iron bar while the other magnetic devices 12, 14 to 25 and 29 are permanent magnets. Magnetic devices 18 and 20 (and likewise magnetic devices 21 and 23) are essentially two halves of a single magnet (cut in half) with the two halves working together. The forces of the two halves are equivalent to the force produced by a whole magnet.

Traction magnetic device 14 is a linear rotating magnetic device and can move up and down as well as sideways but it can only rotate in one direction. The up and down movements are balanced and will remain balanced with no variation. The sideways movement is not balanced but has a combination of controlled force in one direction, as this will force magnetic device 14 to cross the partly reduced parallel field and in the return direction will be in the full parallel position and be forced back under its own guidance by crossing the magnetic field of magnetic device 16. The primary inner core and the outer field do not require each other but are two totally different independent magnetic fields. The two fields are brought together face to face through magnetic device 14 in order to make the two different magnetic fields work together. Each of the outer magnetic devices, such as 16, 18, 20, 22, 24 and non-magnetic device 26 are focussed on traction magnetic device 14 and do not act upon each other but are independent. Similar features apply to the equivalent magnetic devices in sub-system 13.

Figure 7:
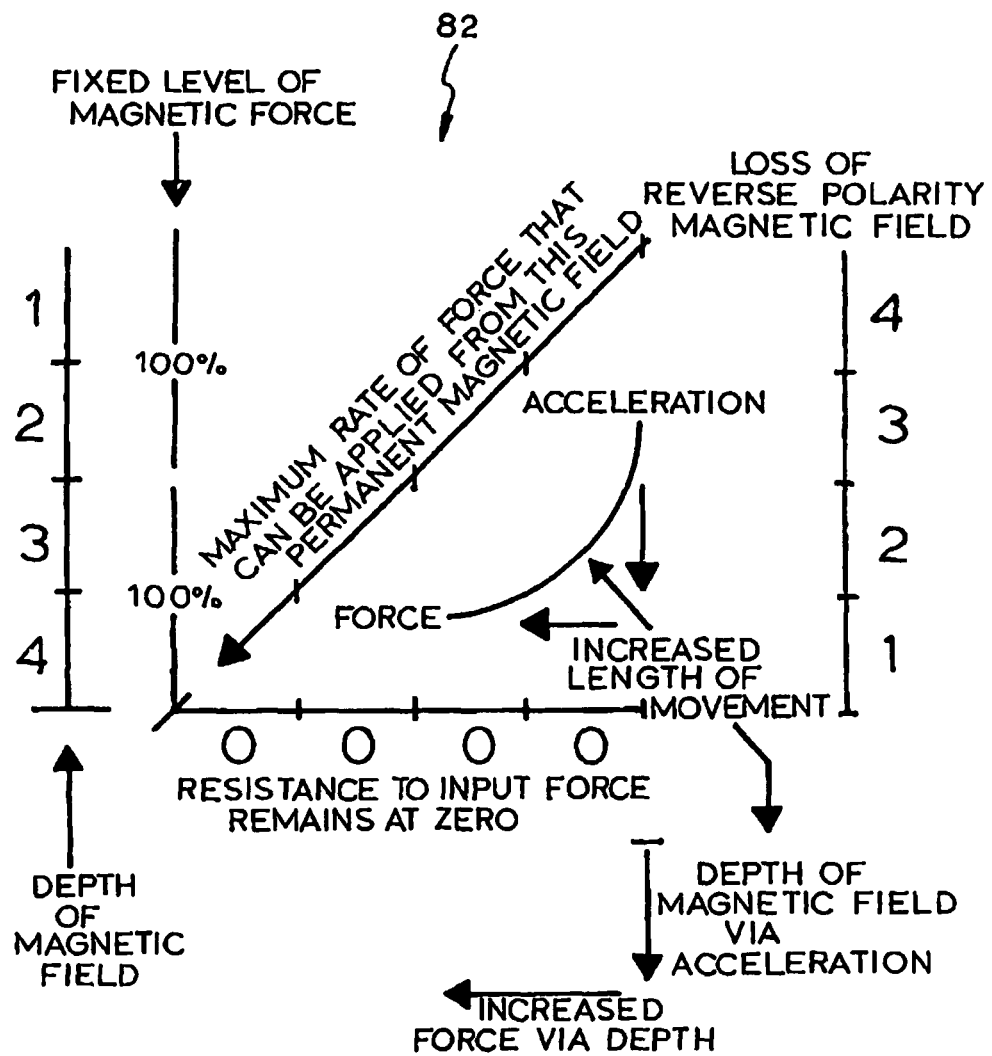
FIG. 7 is a plot of force against acceleration of the first traction magnetic device.

In FIG. 7 there is shown a graph 82 of force versus acceleration of the movement of magnetic device 14. It shows that with the increase in the depth of the magnetic field the force is increased and the acceleration is applied to magnetic device 14 to increase its depth through increased speed applied to shaft 28 (through motor 30). The force also increases as the magnetic field of the reverse polarity magnetic devices decreases. This leads to a greater length of movement of the magnetic device 14 which can produce more outward force up to but not exceeding the strength of magnetic device 16.

Magnetic device 14 moves across the face of magnetic device 12 in a semi-arc motion as well as a horizontal and vertical movement, all at the same time, and only the magnetic device 14 moves as the semi-arc motion creates the point-to-point contact between magnetic devices 14 and 12 which configures the three movements (as described in the next paragraph) and the magnetic field into a precise movement.

Figure 8:
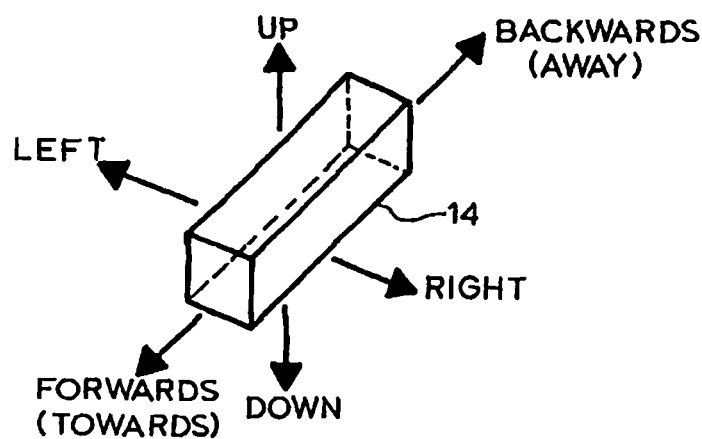
FIG. 8 is a perspective view of a first traction magnetic device undergoing movements simultaneously or concurrently in three dimensions.

Shown in FIG. 8 is a perspective view of first traction magnetic device 14 with arrows to indicate the directions of the three movements (each in a different dimension) of the device 14 occurring simultaneously. Firstly there is the up and down vertical motion that is produced with movement of shaft 28 originating from motor 30. The second movement is horizontal, or orthogonal to the vertical motion, which is left and right. This second motion is the movement of the traction magnetic device 14 across power magnetic device 16 when device 14 contacts foundation magnetic device 12 (left) when edge 33 contacts face 35 and when again later in the cycle device 14 contacts device 12 when edge 38 contacts face 35 (right). The third movement, occurring simultaneously with the first two movements described above, is a semi-arc motion that occurs twice in any one cycle with each sub-system. This is when edge 45 of the traction magnetic device 14 brushes past edge 47 of device 22 in a semi-arc motion, and edge 33 of device 14 brushes past the edge of face 48 of device 16 nearest to edge 33 again in a semi-arc motion. In FIG. 8, the effect is a forwards and backwards motion as indicated therein. Thus, if one looked at the device 14 moving against device 12 from the right side, that is side on looking directly at face 8, one would see a type of elliptical movement with the device 14 going up and down but also having two arc motions at the top and bottom of its cycle. Not seen, from this view directly on to side 8, is the other horizontal motion described above moving left and right.

With magnetic devices 14 and 17, in the lower and upper sub-systems respectively, rigidly coupled together, the devices 14 and 17 form the only mechanical action brought about as a result of one single continuous movement through shaft 28. This continuous single action has three distinct and different sub-movements occurring simultaneously as described above. Force and movement are brought into direct contact through the magnetic fields and there is only one moving part in the system (being devices 17 and 14). This creates one single point of force between the primary core (first field) and the outer field (second field) keeping the two magnetic fields apart. There is no flexibility between the three simultaneous movements, but the actions of the magnetic force upon the individual unique movements are independent.

A larger force can be extracted as output by using a stronger permanent magnetic device. Furthermore the cycle that the magnetic device 14 traverses can be shortened in order to allow for a high speed acceleration to occur due to the shortened time in the cycle, called "shortening".

The present invention has the advantages that no heat is produced and therefore minimal loss of energy through heat. There is no external infrastructure such as cooling water pumps. There is also no noise produced by the invention and no worn parts or the need to use oil, filters or servicing the device. The magnetic devices of the invention allow continuous use. The invention lessens the effects of carbon emissions, as the useable energy is only from the magnetic force embedded in power magnetic devices 16 and 19 (lower and upper sub-systems).

The invention claimed is:

1. A movement generating device comprising:
   an input energy source;
   a shaft adapted for linear motion substantially along a first axis with energy provided from said input energy source;
   a first sub-system comprising a first base magnetic device, a first traction magnetic device and a first power magnetic device, wherein the first traction magnetic device is movable with respect to the first base magnetic device and wherein the first base magnetic device and the first power magnetic device are stationary;
   said first traction magnetic device being connected to said shaft and also connected to or linked to an article;
   a second sub-system comprising a second base magnetic device, a second traction magnetic device and a second power magnetic device, wherein the second base magnetic device is stationary and the second traction magnetic device is movable relative to the second base magnetic device, wherein the second power magnetic device is stationary and said second traction magnetic device is connected to the shaft to balance the magnetic force of the first traction magnetic device in the first sub-system;
   wherein during a first part of a cycle of the movement generating device the first traction magnetic device moves across the first power magnetic device through contact between the first traction magnetic device and the first base magnetic device, the produced movement moving the article in a first direction due to rotation of said shaft about said first axis in a first rotational direction, wherein simultaneously the second traction magnetic device contacts the second base magnetic device in said second sub-system;
   wherein said shaft subsequently moves in a first axial direction, whereupon the first traction magnetic device is in contact with the first base magnetic device such that the shaft rotates in a second rotational direction, opposite to said first rotational direction, and the second traction magnetic device moves across the second power magnetic device through contact between the second traction magnetic device and the second base magnetic device, the movement of the second traction magnetic device across the second power magnetic device enabling said article to move in a second direction, opposite to said first direction;
   wherein said shaft thereafter moves in a second axial direction, opposite to said first axial direction, until said first part of the cycle starts again.

2. A movement generating device according to claim 1 wherein the movement of the first traction magnetic device is substantially orthogonal to said first axis.

3. A movement generating device according to claim 1 wherein the first traction magnetic device moves through said cycle which is controlled by movement of said shaft by said input energy source.

4. A movement generating device according to claim 3 wherein said first traction magnetic device moves across said first power magnetic device once per cycle and said shaft is rotated in the first rotational direction.

5. A movement generating device according to claim 4 wherein the second traction magnetic device is connected or linked to said article and moves across the second power magnetic device, such that movement of the second traction magnetic device moves said article whereby the shaft is rotated in the second rotational direction.

6. A movement generating device according to claim 5 wherein said second traction magnetic device moves across said second power magnetic device once per cycle so that two such movements, one each from the first traction magnetic device and the second traction magnetic device, are produced over one cycle in said movement generating device.

7. A movement generating device according to claim 5 wherein said first base magnetic device is positioned relative to said second base magnetic device so as to balance the magnetic forces between the first sub-system and the second sub-system.

8. A movement generating device according to claim 7 such that when said second traction magnetic device undergoes said movement across the second power magnetic device, said first traction magnetic device in the first sub-system undergoes a movement, whereby a portion of the first traction magnetic device in the first sub-system contacts a portion of the first base magnetic device.

9. A movement generating device according to claim 1 wherein the first axial direction is upwards and the second axial direction is downwards, and wherein further the shaft is connected to a displacement device driven by said input energy source, said displacement device having a swashplate or wobble plate in contact with said shaft so that as the swashplate or wobble plate rotates under the action of the input energy source, the shaft is linearly displaced in an up and down motion during said cycle to thereby move the first traction magnetic device.

10. A movement generating device according to claim 7 such that after the first traction magnetic device has produced said movement across the first power magnetic device, the first traction magnetic device progresses to move within the field produced by the first base magnetic device, said first traction magnetic device having an inner face that does not exceed a halfway point of an inner face of the first base magnetic device as the halfway point is the magnetic limit to maintain balance between the first traction magnetic device and the first base magnetic device.

11. A method of generating movement in a system using a magnetic device comprising the steps of:
providing an input energy source;
providing energy from said input energy source to a shaft adapted for linear movement substantially along a first axis;
connecting a first traction magnetic device in a first sub-system to said shaft and to an article;
providing a first power magnetic device and a first base magnetic device in said first sub-system, wherein the first traction magnetic device is movable with respect to the first base magnetic device and wherein the first base magnetic device and the first power magnetic device are stationary;
providing a second traction magnetic device, a second base magnetic device and a second power magnetic device in a second sub-system, wherein the second base magnetic device is stationary and the second traction magnetic device is movable relative to the second base magnetic device, wherein the second power magnetic device is stationary;
connecting said second traction magnetic device to the shaft thereby balancing the magnetic force of the first traction magnetic device in the first sub-system;
wherein during a first part of a cycle of the movement generating device the first traction magnetic device moves across the first power magnetic device through contact between the first traction magnetic device and the first base magnetic device, the produced movement moving the article in a first direction due to rotation of said shaft about said first axis in a first rotational direction, wherein simultaneously the second traction magnetic device contacts the second base magnetic device in said second sub-system;
wherein said shaft subsequently moves in a first axial direction, whereupon the first traction magnetic device is in contact with the first base magnetic device such that the shaft rotates in a second rotational direction, opposite to said first rotational direction, and the second traction magnetic device moves across the second power magnetic device through contact between the second traction magnetic device and the second base magnetic device, the movement of the second traction magnetic device across the second power magnetic device enabling said article to move in a second direction, opposite to said first direction;
wherein said shaft thereafter moves in a second axial direction, opposite to said first axial direction, until said first part of the cycle starts again.

12. A method according to claim 11 further comprising controlling the movement of the first traction magnetic device through said cycle by movement of said shaft by said input energy source.

13. A method according to claim 12, wherein the second traction magnetic device is connected or linked to said article and moves across the second power magnetic device, such that movement of the second traction magnetic device moves said article whereby the shaft is rotated in the second rotational direction.

14. A method according to claim 12 wherein said second traction magnetic device moves across the second power magnetic device once per cycle so that two such movements, one each from the first traction magnetic device and the second traction magnetic device, are produced over one cycle.

15. A method according to claim 14 wherein said first base magnetic device is positioned relative to said second base magnetic device so as to balance the magnetic forces between the first sub-system and the second sub-system.

16. A method according to claim 15 such that when said second traction magnetic device undergoes said movement across the second power magnetic device, said first traction magnetic device in the first sub-system undergoes a movement, whereby a portion of the first traction magnetic device in the first sub-system contacts a portion of the first base magnetic device.

17. A method according to claim 11 wherein the first axial direction is upwards and the second axial direction is downwards, and wherein further the method comprises connecting the shaft to a displacement device driven by said input energy source, said displacement device having a swashplate or wobble plate in contact with said shaft so that as the swashplate or wobble plate rotates under the action of the input energy source, the shaft is linearly displaced in an up and down motion during said cycle to thereby move the first traction magnetic device.

18. A method according to claim 17 such that after the first traction magnetic device has produced said movement across the first power magnetic device, the first traction magnetic device progresses to move within the field produced by the first base magnetic device, said first traction magnetic device having an inner face that does not exceed a halfway point of an inner face of the first base magnetic device as the halfway point is the magnetic limit to maintain balance between the first traction magnetic device and the first base magnetic device.

* * * * *